G. W. HILDRETH.
SEAT FOR SCHOOL DESKS.
No. 4,268. Reissued Feb. 21, 1871.
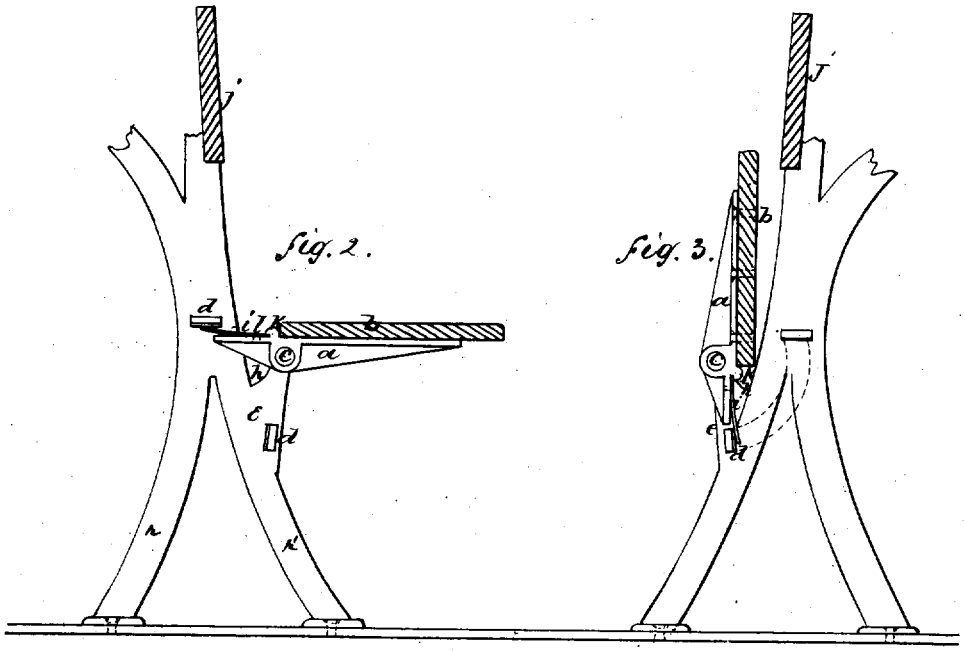
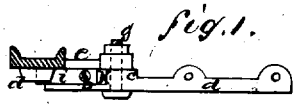
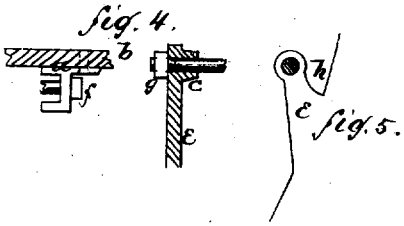
fig. 6.
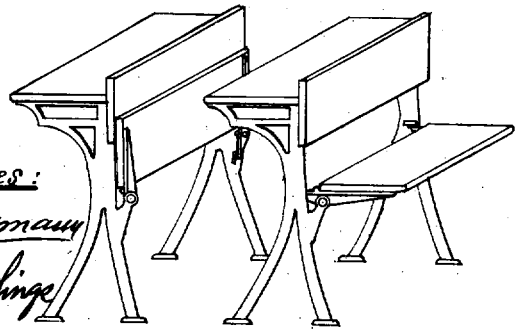
Witnesses:
Victor Hagmann
A. C. Rawlings
Inventor:
George W. Hildreth
By Hill & Ellsworth
attys
THE NORRIS PETERS CO., PHOTO-LITHO., WASHINGTON, D. C.

United States Patent Office.

GEORGE W. HILDRETH, OF LOCKPORT, NEW YORK.

Letters Patent No. 55,293, dated June 5, 1866; reissue No. 4,268, dated February 21, 1871.

IMPROVEMENT IN SEATS FOR SCHOOL-DESKS.

The Schedule referred to in these Letters Patent and making part of the same.

*To all whom it may concern:*

Be it known that I, GEORGE W. HILDRETH, of Lockport, in the county of Niagara and the State of New York, have invented certain new and useful Improvements in School-Desks and Seats; and I do hereby declare the following to be a full, clear, and exact description of the same, reference being had to the accompanying drawing forming part of this specification, in which—

Figure 1 is a section through line *x x* of fig. 2;

Figures 2 and 3 are side elevations;

Figure 4 is a detached sectional view, showing the construction of the pivot;

Figure 5 is a side view of the pivot and fulcrum; and

Figure 6 is a perspective view, representing the seat and desk in practical operation in the school-room.

Similar letters of reference in the drawing denote corresponding parts.

This invention relates to that class of seats in which the bottom of the seat is capable of being turned up or down for the purpose of accommodating the occupant in a standing or sitting posture, facilitating his entrance to and departure from the seat, and economizing room in the arrangement of the seats in rows in a school-room or other public hall; and The invention consists—

First, in the peculiar construction of the joint by which the bottom of the seat is prevented from falling to the floor when the pivot-bolt or nut is withdrawn.

Secondly, in the employment of an adjustable bolt and nut adapted to tighten the joint, so that the seat can be made to stand in any required position, only a slight force being necessary to turn it down or up.

Thirdly, in making the pivot conical or tapering, for the purpose of preventing the wearing of the joint from interfering with the operation of the tightening-bolt or nut.

Fourthly, in the employment of springs in connection with the rear end of the seat, and the stops upon the frame, for the purpose of preventing noise and giving the proper degree of elasticity to the seat.

In the drawing—

*a* is an arm, pivoted to the main frame of the seat or desk by means of a fulcrum, *c*.

On its longer end, in front of and over the fulcrum, it supports the seat bottom, and upon its rear extremity is fastened a spring or spring-pad, *i*, which, when the seat is turned up or down, bears against a stop, *d*, on the main frame, for the purpose of preventing noise and rendering the seat elastic.

In addition to this the spring saves the seat from injury, and also causes a small space to be left between the edge of the seat when turned up and the desk, so that the occupant can easily insert his fingers to lower the seat.

The spring may be fastened to the arm by running one end of it into a slot under a projection, and riveting it fast, as shown at *l*, figs. 1, 2, and 3. Should it break, the end of the arm extends far enough to come in contact with the stop *d*, so that the seat cannot fall.

The standard *e*, projecting upward from the main frame for the purpose of supporting the seat and fulcrum, is so constructed and arranged with relation to the frame and the upper stop *d* that the downward pressure of the seat will be exerted longitudinally upon it, and will have no tendency to fracture it transversely. At the same time the front leg of the frame that supports the standard is curved, as shown in figs. 2 and 3, to enable it to sustain the standard at the greatest advantage.

The whole structure is such that, although the pivot is held out at some distance from the frame, so as to diminish the leverage upon the stops and fulcrum, yet the weight upon the seat has very little tendency to wrench the frame, and the center of gravity falling between the two legs *r r'*, there is no tendency to upset the seat.

One of the most important features of my invention is the construction of the pivot-joint *c*, which, although adapted to operate with a bolt and tightening-nut, will yet hold the seat securely and answer as a fulcrum perfectly, even should the bolt and nut fall out or be removed by some mischievous scholar. This result is effected by casting either the arm or the standard *e* with a tubular pivot or trunnion, *c*, and the other part (standard or arm, as the case may be) with a socket, to receive the trunnion, and bolting them together by means of a bolt, *f*, which passes longitudinally through the tubular trunnion, and is provided with a tightening-nut, *g*, at one end, as clearly shown in figs. 1 and 4.

The arms *a a*, which form the side pieces of the seat-frame, are held apart by the front and rear pieces, or by the plank seat when such construction is employed, and, consequently, as the seat fills the space between the supports on each side of it, it is impossible for the trunnions to escape from their sockets even when the fastening-bolt is withdrawn.

The bolts and nuts are not, however, without a purpose. By screwing up the nut the joint can be so tightened that the friction between its parts will hold the seat at any desired inclination, so that it will not fall by its own weight, but a slight force will be requisite therefor. Unnecessary noise is thereby prevented, and the seat is not liable to injury from constant concussion in dropping.

To enable the joint to be more readily and perfectly tightened up in the manner described, and prevent the wearing of the parts from affecting their operation, the trunnion and sockets may be made slightly tapering, as shown in fig. 4, so that, however they may wear away, they can be always tightened up to any degree required by simply screwing up the nut.

The joint is operative for all purposes, whether the socket and trunnion be tapering or not; but when worn away by long use the parts can be brought together more perfectly if made tapering.

The advantages of the seat herein described, especially for school purposes, are numerous and important.

It is neat and ornamental in appearance, and occupies the least possible space.

It is not in the way in washing the floors or sweeping the room.

It is more convenient to enter and leave, and if the scholar wishes to stand up without leaving his seat it accommodates him perfectly.

The operation of it causes no noise.

It cannot be unjointed by removing the bolt and thus made to precipitate its occupant to the floor.

It is elastic, and therefore not fatiguing to sit in, nor liable to injury by the carelessness of the scholar in dropping it or throwing himself into it.

Having thus described my invention,

What I claim as new therein, and desire to secure by Letters Patent, is—

1. The pivot and corresponding socket, in combination with the seat-arm and standard, when so constructed that without the aid of the bolt and nut the seat will be properly supported, and will be capable of turning up and down, substantially as described.

2. The bolt *f* and nut *g*, in combination with the seat-arm *a*, the support *e*, pivot *c*, and the socket, substantially as described and for the purposes specified.

3. The trunnion and socket, when made tapering, and combined with the seat-arm, support, and bolt and nut, substantially as described and for the purposes set forth.

4. The spring I and stops *d d*, for the purposes herein specified and shown.

GEORGE W. HILDRETH.

Witnesses:

E. A. ELLSWORTH,
N. K. ELLSWORTH.